P. MARTIN.
Clothes-Frames.
No. 148,478. Patented March 10, 1874.
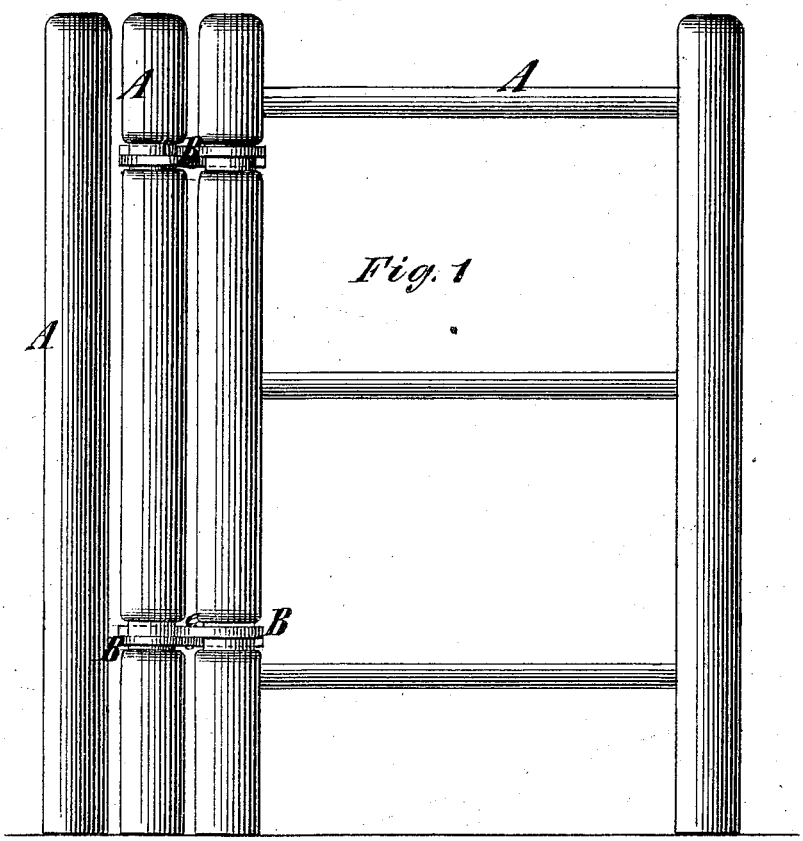
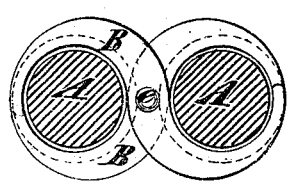
Witnesses.
Michael Ryan
Fred Haynes
Peter Martin
by his attorneys
Brown & Allen

UNITED STATES PATENT OFFICE.

PETER MARTIN, OF NEWARK, NEW JERSEY.

IMPROVEMENT IN CLOTHES-FRAMES.

Specification forming part of Letters Patent No. 148,478, dated March 10, 1874; application filed August 21, 1873.

*To all whom it may concern:*

Be it known that I, PETER MARTIN, of Newark, in the county of Essex and State of New Jersey, have invented an Improved Clothes-Frame, of which the following is a specification:

This invention consists in the combination, with the leaves of a clothes-frame, of pairs of S-shaped jaw-pieces, pivoted together after the manner of calipers. These, in both directions beyond their pivots, embrace the posts of adjacent leaves of the clothes-frame, and fasten them together in a manner which, while very secure, yet affords ample provision for folding the leaves, and, moreover, enables them to be readily detached one from the others, if this be desirable for any reason.

In the accompanying drawing, Figure 1 is a side view of the improved clothes-frame, partially folded; and Fig. 2 is a sectional view of the same, taken at one of the connecting-pieces.

Similar letters of reference indicate corresponding parts in both figures.

A A indicate the several leaves of the clothes-frame. Their general make is ordinary, but they have round posts for the jaw-pieces B B to embrace. These jaw-pieces are each S-shaped, and are united in pairs at the middle in reverse positions by pivots *e e*. They resemble calipers, and each half beyond the connecting-pivot embraces one post of the leaves of the frame to be united. In the posts are circumferential grooves or recesses, which receive the jaw-pieces, and retain them in place as regards vertical displacement. To fasten the leaves together by these jaw-pieces, the latter are opened so that their ends can pass around the posts, and are afterward closed to embrace them.

When once applied, there is no tendency whatever to work loose, and the leaves are afforded ample provision for folding into any position.

Should it be desirable for any purpose to detach one of the leaves of the frame from the others, it can be effected very readily, as all that has to be done is to open the jaw-pieces so that the post of the leaf to be removed can be withdrawn from between them.

The clothes-frame thus made is at once simple and strong. Moreover, it possesses the advantage of durability in a very high degree, inasmuch as the breakage of the connections between the leaves (a defect inherent in all frames having their leaves united by straps) is wholly obviated.

What I claim as my invention is—

The combination, with the leaves of a clothes-frame, of pairs of reversed S-shaped jaw-pieces, united at the middle by pivots, substantially as and for the purpose herein set forth.

PETER MARTIN.

Witnesses:
HENRY T. BROWN,
MICHAEL RYAN.